United States Patent
Mauldin, Jr.

[11] Patent Number: 5,813,366
[45] Date of Patent: Sep. 29, 1998

[54] ANIMAL TOY

[76] Inventor: William David Mauldin, Jr., 1807 Grove St., Sarasota, Fla. 34239

[21] Appl. No.: 786,866

[22] Filed: Jan. 23, 1997

[51] Int. Cl.⁶ .................................................. A01K 29/00
[52] U.S. Cl. .......................................... 119/710; 119/707
[58] Field of Search ................................... 119/710, 711, 119/707, 709; D30/160; 446/437, 396, 325

[56] References Cited

U.S. PATENT DOCUMENTS

| D. 343,930 | 2/1994 | Garcia | D30/160 |
|---|---|---|---|
| D. 346,048 | 4/1994 | Jandebeur et al. | D30/160 |
| 848,136 | 3/1907 | Smith | 119/711 |
| 1,022,112 | 4/1912 | Smith | 119/711 |
| 1,031,095 | 7/1912 | Smith | 119/711 |
| 1,534,964 | 4/1925 | Kahnweiler | 119/711 |
| 4,513,014 | 4/1985 | Edwards | 426/132 |
| 4,842,563 | 6/1989 | Russell | 446/437 |
| 4,907,537 | 3/1990 | Shirk | 119/707 |
| 5,191,856 | 3/1993 | Gordon | 119/711 |
| 5,390,629 | 2/1995 | Simone | 119/711 |

Primary Examiner—Gene Mancene
Assistant Examiner—Yvonne R. Abbott
Attorney, Agent, or Firm—Charles J. Prescott

[57] ABSTRACT

An animal toy (10) composed of a highly-durable, non-toxic, flexible, elastomeric, plastic, or like material, having a single or numerous gripping shaft(s) (12) with rows of gripping splines (14) and holding grooves (16) that will accept and contain a variety of sizes of treats (18), (20), (22) that may be endlessly replenished. In addition, the body (24),(26) of the animal toy (10) is shaped in a manner that encourages play and use even without the addition of food products or other sensory attractors.

11 Claims, 4 Drawing Sheets

ANIMAL TOY

BACKGROUND—FIELD OF INVENTION

This invention relates to animal toys, specifically to animal toys that hold sensory attractors.

BACKGROUND—DESCRIPTION OF PRIOR ART

It is known that animals, particularly dogs and cats, enjoy playing with toys composed of animal product, plastic, elastomeric and other like materials. It is also known that these animals enjoy eating good tasting food products. This knowledge has resulted in the manufacture of various pet toys composed of various materials and edible dog treats. It too has resulted in toys that permanently combine a food product, bone-type chew component, or sensory attractor, (ie. flavor, scent or catnip), with a inedible structural component such as a rope or bone.

Pet toys such as U.S. Pat. No. D343,930 to Garcia(1994), U.S. Pat. No. 1,534,964 to Kahnweiler (1923), and U.S. Pat. No. D346,048 to Jandebeur et al.(1994) are exemplary of this type of structure. These toys are designed to remain for their lifetime in their original configuration. Taking Jandebeur's invention as an example of this type of toy, one finds that because the sensory attractor is integral to the toys effectiveness, when the attractor is damaged, destroyed, or consumed, the toy is no longer useful. As animals like dogs primarily use their mouths and teeth to play with such toys, the life span of such a structure is obviously short.

U.S. Pat. No. 5,191,856 to Gordon(1993) also holds an object, assumably the herb catnip, within its central shaft. Again, this material is cannot be removed without the toy incurring damage that would constitute a degradation of the toys functionality.

Lastly, U.S. Pat. No. 4,513,014 to Edwards(1985), shows the use of a sensory attractor, ie. a "pleasing flavor" mixed into the bone's polyurethane, to attract an animal. This toy's sensory attractor is not an additional component, but is in fact the entire toy. Even as this is the case, the toy's effectiveness is not increased as it also will be degraded when chewed and consumed. In addition, flavored polyurethane is not a food product and the flavoring will obviously encourage an animal to eat a non-food product which is not nutritious and poses a potential danger to the digestive system.

In sum, these prior inventions are limited by one or more of the following factors:

(a) The invention is presented in a permanent, unalterable configuration and must remain in this configuration to continue to fulfill its purpose, ie. entertainment, and/or pacification.

(b) The removal or consumption of the sensory attractive portions of the invention would render it useless or of lesser entertainment value as cannot be replenished.

(c) The invention has no means to grip or attach a replacement sensory attractor if the first sensory attractor is removed, therefore, leaving the invention to have little longevity.

(d) The invention may only use one sensory attractor in its lifetime, this being its original.

(e) The invention cannot be altered to conform to the tastes of its user as it is permanently configured.

(f) The invention cannot hold or offer multiple sensory attractors at any one given time.

(g) The invention encourages the consumption of non-food components that when eaten could endanger pet safety.

OBJECTS AND ADVANTAGES

In contrast, my invention combines entertainment and therapeutic with functional qualities. Several objects and advantages are:

(a) to provide a toy without dangerous non-food parts that may be broken off and consumed;

(b) to provide flexible gripping shafts that will adapt to the size and shape of whatever food substance or other sensory attractor (ie. catnip) is used within its limits;

(c) to provide a toy that has a sensory attractor (ie. food product/catnip) that may be safely consumed and endlessly replenished;

(d) to provide a toy that may be adapted to the tastes of its user;

(e) to provide a toy that has the ability to accept multiple and various food products at one and any given time;

(f) to provide a toy that has the ability to be changed with new food products replacing others that have been consumed or have lost their novelty;

(g) to provide a toy that is a challenge to the animal with the food products placed at a distance from which they are somewhat challenging to retrieve;

(h) to provide lengthy time periods of pacification and play to animals with attention, destructive, and mental disorders such as separation anxiety;

(i) to provide pacification and play to healthy animals.

Still further objects and advantages will become apparent from a consideration of the ensuing description and drawings.

DRAWING FIGURES

In the drawings, closely related figures have the same number but different alphabetic suffixes.

REFERENCE NUMERALS IN DRAWINGS

Figure 1A:
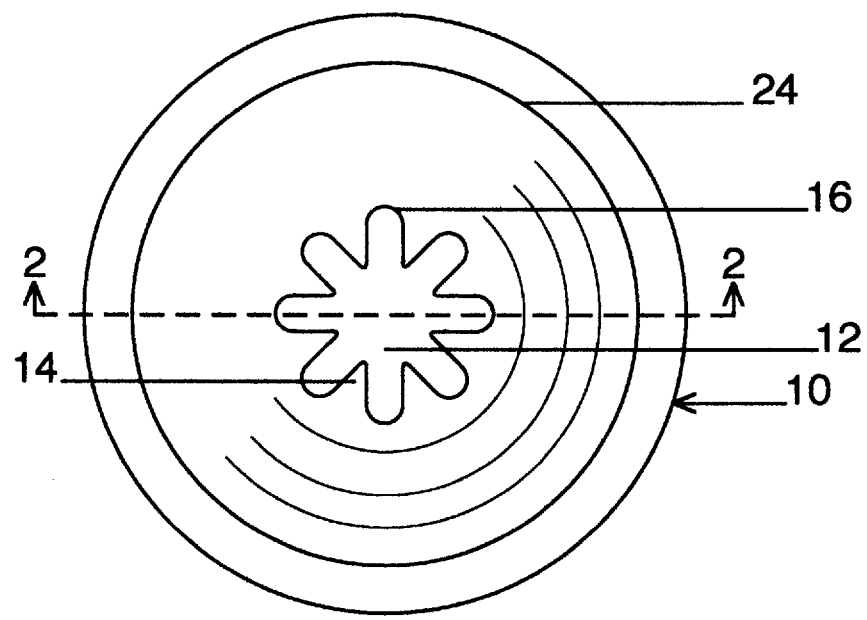
FIG. 1A shows an plan view of an elastomeric ball toy with a flexible, central gripping shaft.

10 animal toy
12 gripping shaft
14 gripping splines
16 holding grooves
18 minimum sized object
20 maximum sized object 22 irregularly shaped object
24 body
26 alternative body
28 twelve toothed gripping shaft

Description—FIGS. to 1A–5B

Figure 4A:
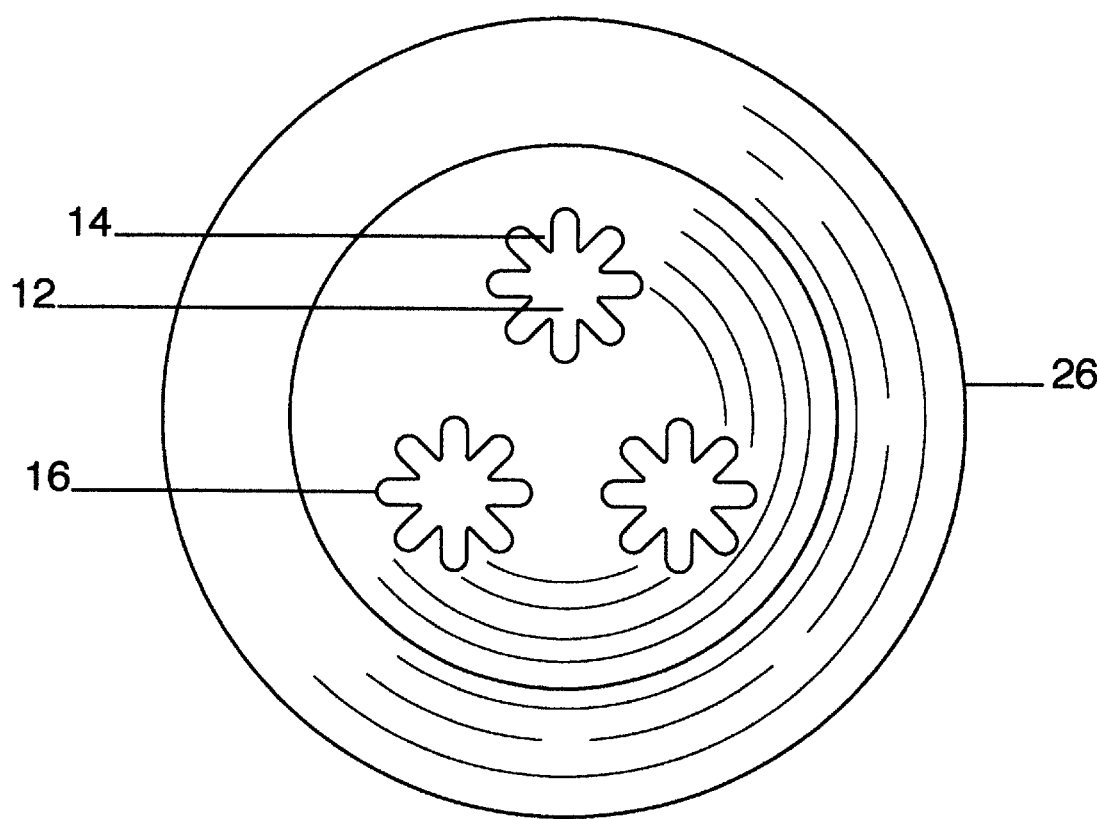
FIG. 4A shows a plan view of a second toy body utilizing three gripping shafts.
Figure 4B:
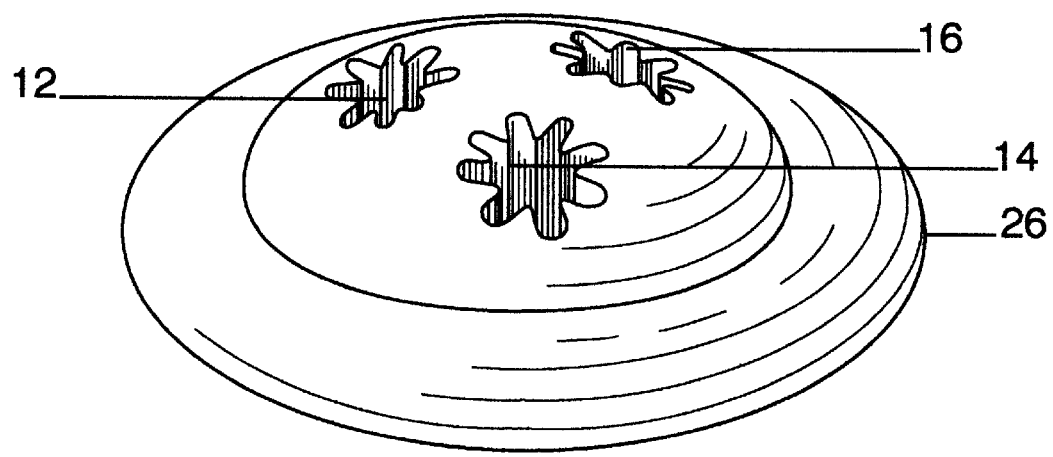
FIG. 4B shows a perspective view of this second toy.
Figure 5A:
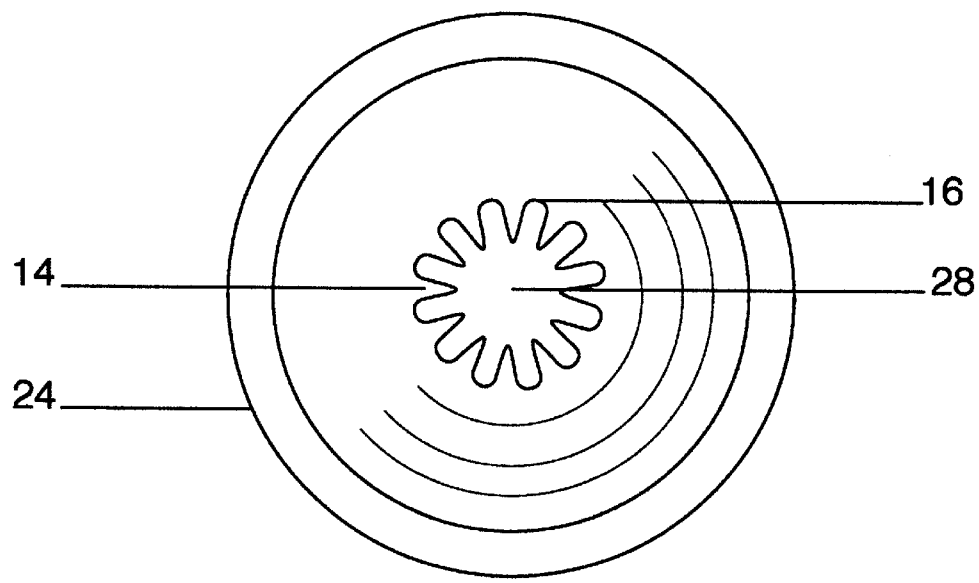
FIG. 5A shows a third toy body utilizing a single, 12 pronged gripping shaft.
Figure 5B:
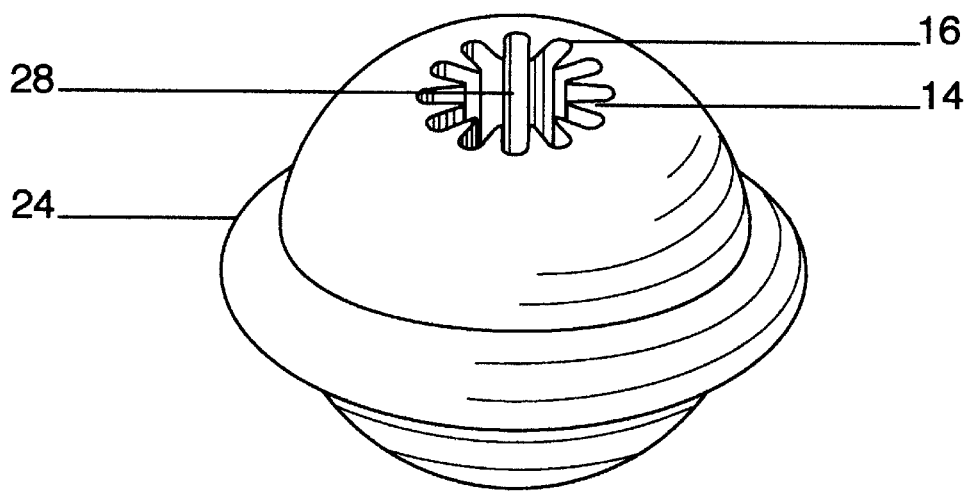
FIG. 5B shows a perspective view of this third toy.

A typical embodiment of my animal toy is illustrated in FIGS. 1A (plan view) and 1B (perspective view). These figures show an animal toy 10 that is composed of a flexible material, such as a non-toxic elastomer, molded into an interesting, ball shape to encourage play. Animal toy 10 has through its center an open gripping shaft 12. Shaft 12 preferably has eight, although any number could be used, longitudinally configured gripping splines 14 coupled with corresponding holding grooves 16. As exemplified in FIGS. 2 and 3A–3C, splines 14 may be crushed or displaced to adjust and grip the contours of a multiplicity of objects 18, 20, 22. There are endless design possibilities with regard to the shape and size of a body 24 and the position, shapes, and numbers of shafts 12, grooves 16, and splines 14. FIG. 4A (plan view) and 4B (perspective view), show an alternative body 26, a wheel-like, rollable shape utilizing three shafts 12. FIG. 5A (plan view) and 5B (perspective view) show a third configuration with body 24 housing a single twelve toothed gripping shaft 28.

Figure 1B:
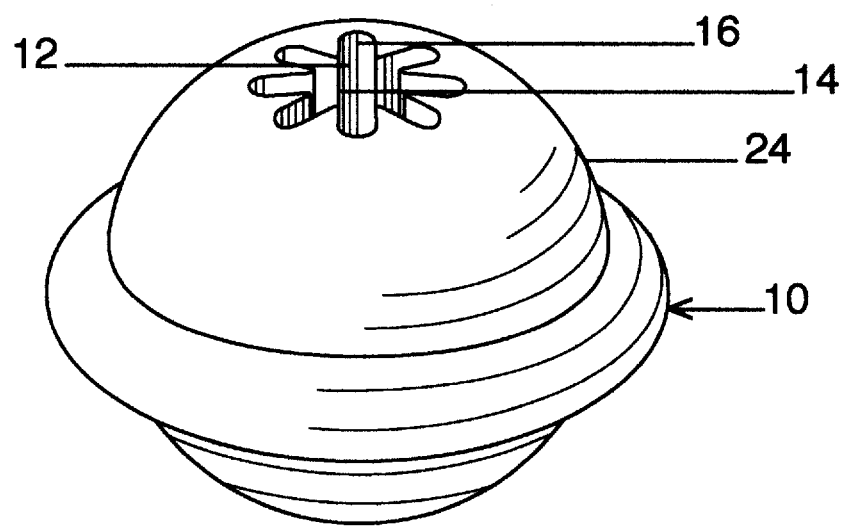
FIG. 1B shows a perspective view of this ball toy.
Figure 2:
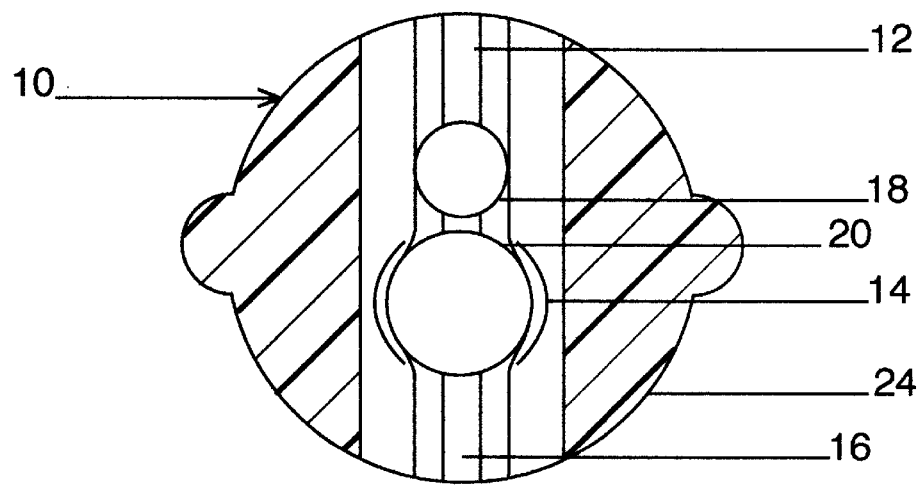
FIG. 2 shows a profile sectional view of this same ball toy and its gripping shaft with two treats being held.
Figure 3A:
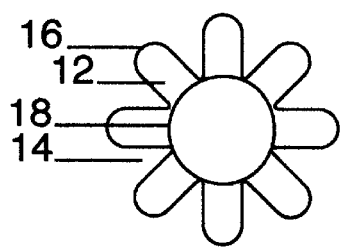
FIG. 3A shows a detail of a gripping shaft holding its minimum treat size.
Figure 3B:
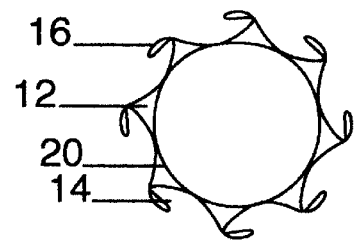
FIG. 3B shows a detail of a gripping shaft holding its maximum treat size.
Figure 3C:
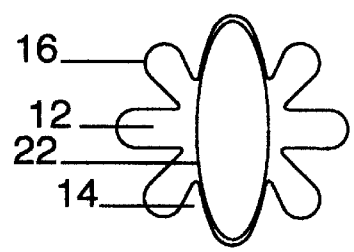
FIG. 3C shows a detail of a gripping shaft holding an irregularly sized treat.

Operation—FIGS. 1A–1B

The manner of using the pet toy with gripping shafts is quite clear and understandable. Namely, one finds a food product that will fit within the spatial parameters of the shaft. This particular example has an inner structural ball with a diameter of 6.6675 cm (2.625 inches), leaving the shaft with a corresponding maximum depth of 6.6675 cm (2.625 inches). The shaft will accept an object with a minimum diameter of 1.27 cm (0.5 inches) and a maximum diameter of 2.8575 cm (1.125 inches). It will, of course, also accept any shape, however irregular, between these tolerances. To install the food product, first, place it into the top of the shaft. Next, using an index finger, push the treat to the approximate center of the shaft or 3.175 cm (1.25 inches) down. The treat will be held in place by the longitudinal splines. If more than one treat is to be used, the others are installed in the same manner and may continue to be installed until no more are accepted. The toy is then given to a pet for play. The pet will lick the shafts to try to dissolve the treats or to dislodge them. This process can take some time depending upon the composition of the treat, the voracity of the animal, and the number of treats used. It is also important to note that the toy has a body composed of a highly durable, flexible material with high tensile strength and puncture resistance, (most likely an elastomer), that can withstand extensive chewing before showing any signs of wear. Also, the body is shaped in a way that evokes play, such as a ball, encouraging the pet to use the toy even without the addition of edible treats or sensory attractors.

Summary, Ramifications, and Scope

From the description above, the reader will see that this invention provides its user with play, therapy, adaptability, longevity, safety, and functionality, with additional advantages in that the toy pacifies any pet, especially dogs and cats, and aids the teething process of puppies;

the toy pacifies and comforts pets with orally destructive and mental disorders;

the food products held within the gripping shafts provide a challenge for removal which pacifies the animal for lengthy periods of time;

the gripping shafts allow the contained food products to be consumed and replenished;

the gripping shafts may be filled with a variety of food products for a single usage;

the toy has the ability to provide a sensory attractor that may be consumed and replenished in perpetuity without damaging the toy or decreasing its effectiveness;

the gripping shafts are constructed to adapt to a variety of sizes and shapes of food products;

the toys primary sensory attractors are safe, edible food products;

the toy does not have non-food parts or components that are likely to be consumed and pose a health hazard;

the toy may be used without the addition of food products as a self-contained chew toy.

Although the description above contains many specificities, these should not be construed as limiting the scope of the invention but as merely providing illustrations of some of the presently preferred embodiments of this invention. For example, the body can have other shapes, such as a ring, oval, egg, etc.; the grip shafts can have other shapes and there may be various numbers of teeth and grooves, and there may be any number of gripping shafts as will reasonably fit within a particular body size without effecting the body's structural integrity.

Thus the scope of the invention should be determined by the appended claims and their legal equivalents, rather than by the examples given.

I claim:

1. A non-consumable animal toy comprising:

a three-dimensional body formed of substantially solid resilient material;

said body having a gripping shaft formed centrally through said body and open at each end thereof, said gripping shaft including spaced flexible splines which are substantially coextensive with said gripping shaft and which cooperatively act to resiliently receive and hold a small quantity of animal food or attractant whereby the animal food or attractant is accessible for consumption or sensory detection, respectively, by an animal from each said open end of said gripping shaft.

2. A non-consumable animal toy as set forth in claim 1, wherein:

said body is hand throwable and includes an outwardly extending rib or bead which enhances throwability and resistance to rolling movement during play.

3. A non-consumable animal toy as set forth in claim 1, wherein:

said body is substantially spherical in shape and includes a circumferential outwardly extending continuous bead integrally formed therearound.

4. A non-consumable animal toy as set forth in claim 1, wherein:

distal inner edges of said splines define a substantially cylindrical longitudinally extending inner profile of said gripping shaft which determines a minimum animal food size which is retainable within said gripping shaft.

5. A non-consumable animal toy as set forth in claim 1, wherein:

said body is substantially ellipsoidal in shape and includes a circumferential outwardly extending centroidal bead or rib formed therearound.

6. A throwable, non-consumable animal play toy which is enhanced for animal use by receiving and retaining food and other sensory attractors comprising:

a three-dimensional body molded of a substantially solid, resilient elastomeric material;

a refillable, hollow food or attractant receiving and retaining shaft formed through a central portion of said body whereby said shaft is open at each end thereof for receiving food or attractant and for providing access thereto by the animal;

resilient splines formed integrally within said shaft for biasingly retaining the food or attractant placed into said shaft.

7. A non-consumable animal toy as set forth in claim 6, wherein:

said body is hand throwable and includes an outwardly extending rib or bead which enhances throwability and resistance to rolling movement during play.

8. A non-consumable animal toy as set forth in claim 7, wherein:

distal inner edges of said splines define a substantially cylindrical longitudinally extending inner profile of said gripping shaft which determines a minimum animal food size which is retainable within said gripping shaft.

9. A non-consumable animal toy as set forth in claim 6, wherein:

said body is substantially spherical in shape and includes a circumferential outwardly extending continuous bead integrally formed therearound.

10. A non-consumable animal toy as set forth in claim 6, wherein:

said body is substantially ellipsoidal in shape and includes a circumferential outwardly extending centroidal bead or rib formed therearound.

11. A throwable, non-consumable animal play toy which is enhanced for animal use by receiving and retaining food and other sensory attractors comprising:

a three-dimensional body molded of a substantially solid, resilient material;

a refillable, hollow food or attractant receiving and retaining aperture formed through a central portion of said body whereby said aperture is open at each end thereof for receiving food or attractant and for providing access thereto by the animal;

said retaining aperture having a generally star-shaped cross sectional shape wherein innermost edges of said cross sectional shape are resiliently deformable for biasingly retaining the food or attractant placed into said shaft.

* * * * *

(12) REEXAMINATION CERTIFICATE (4275th)

United States Patent
Mauldin, Jr.

(10) Number: US 5,813,366 C1
(45) Certificate Issued: Feb. 20, 2001

(54) ANIMAL TOY

(75) Inventor: William David Mauldin, Jr., 1807 Grove St., Sarasota, FL (US) 34239

(73) Assignee: William David Mauldin, Jr., Sarasota, FL (US)

Reexamination Request:
No. 90/005,410, Jun. 30, 1999

Reexamination Certificate for:
Patent No.: 5,813,366
Issued: Sep. 29, 1998
Appl. No.: 08/786,866
Filed: Jan. 23, 1997

(51) Int. Cl.$^7$ .................................................. A01K 29/00
(52) U.S. Cl. .................................... 119/710; 119/707
(58) Field of Search ................................ 119/707, 709, 119/710, 711; D30/160; 446/325, 437, 396

(56) References Cited

U.S. PATENT DOCUMENTS

| Re. 34,352 | 8/1993 | Markham et al. . |
| D. 188,179 | 6/1960 | Tay . |
| D. 256,958 | 9/1980 | Markham . |
| 1,149,170 | 8/1915 | Allis . |
| 1,534,964 | 4/1925 | Kahnweiler . |
| 5,595,142 | 1/1997 | Chill . |
| 5,640,931 | 6/1997 | Markham . |

*Primary Examiner*—Peter M. Poon

(57) ABSTRACT

An animal toy (10) composed of a highly-durable, non-toxic, flexible, elastomeric, plastic, or like material, having a single or numerous gripping shaft(s) (12) with rows of gripping splines (14) and holding grooves (16) that will accepy and contain a variety of sizes of treats (18), (20), (22) that may be endlessly replenished. In addition, the body (24), (26) of the animal toy (10) is shaped in a manner that encourages play and use even without the addition of food products or other sensory attractors.

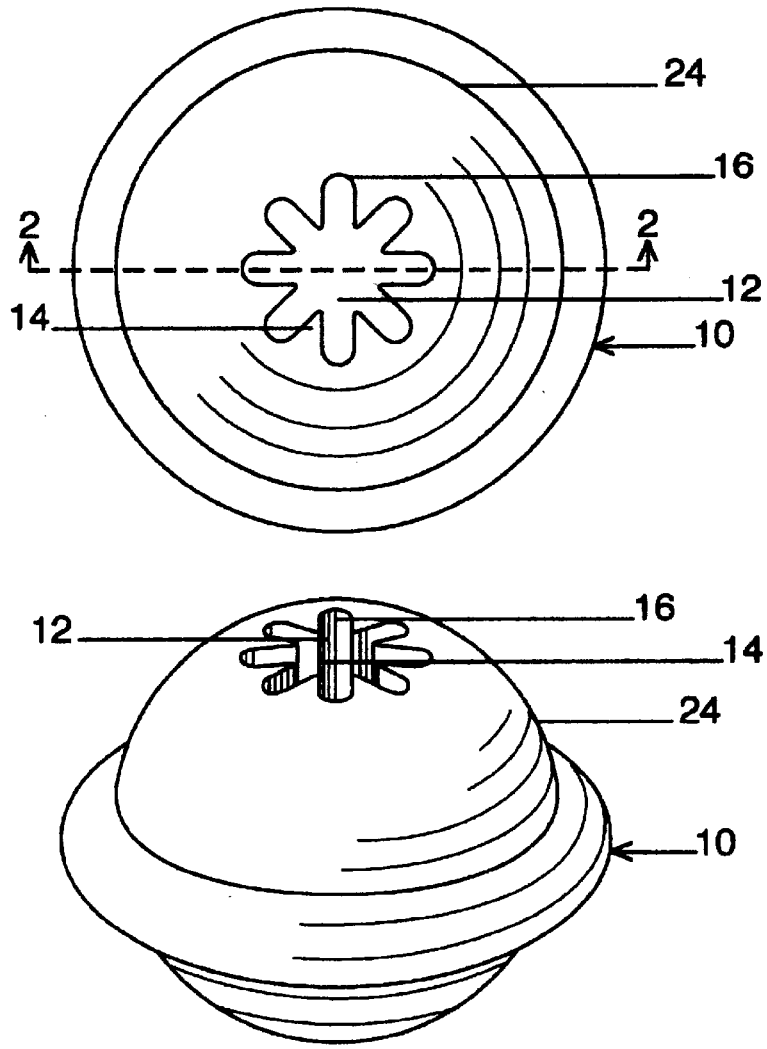

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 6–21:

A typical embodiment of my animal toy is illustrated in FIGS. 1A (plan view) and 1B (perspective view). These figures show an animal toy 10 that is composed of a flexible material, such as a non-toxic elastomer, molded into an interesting, ball shape to encourage play. Animal toy 10 has through its center an open gripping shaft 12. Shaft 12 preferably has eight, although any number could be used, longitudinally configured gripping splines 14 coupled with corresponding holding grooves 16. As exemplified in FIGS. 2 and 3A–3C, splines 14 may be crushed or displaced to adjust and grip the contours of a multiplicity of objects 18, 20, 22. *A circumferential bead is integrally formed around the body of animal toy 10 and extends away from gripping shaft 12.* There are endless design possibilities with regard to the shape and size of a body 24 and the position, shapes, and numbers of shafts 12, grooves 16, and splines 14. FIG. 4A (plan view) and 4B (perspective view)[,] show an alternative body 26, a wheel-like, rollable shape utilizing three shafts 12. FIG. 5A (plan view) and 5B (perspective view) show a third configuration with body 24 housing a single twelve toothed gripping shaft 28. *A circumferential bead is integrally formed around alternative body 26 and extends away from gripping shafts 12.*

Column 3, lines 26–54:

The manner of using the pet toy with gripping shafts is quite clear and understandable. Namely, one finds a food product that will fit within the spatial parameters of the shaft. This particular example has an inner structural ball with a diameter of 6.6675 cm (2.625 inches), leaving the shaft with a corresponding maximum depth of 6.6675 cm (2.625 inches). The shaft will accept an object with a minimum diameter of 1.27 cm (0.5 inches) and a maximum diameter of 2.8575 cm (1.125 inches). *This minimum diameter defines an inner profile within said gripping shaft between the tips or ends of the splines.* It will, of course, also accept any shape, however irregular, between these tolerances. To install the food product, first, place it into the top of the shaft. Next, using an index finger, push the treat to the approximate center of the shaft or 3.175 cm (1.25 inches) down. The treat will be held in place by the longitudinal splines. If more than one treat is to be used, the others are installed in the same manner and may continue to be installed until no more are accepted. The toy is then given to a pet for play. The pet will lick the shafts to try to dissolve the treats or to dislodge them. This process can take some time depending upon the composition of the treat, the voracity of the animal, and the number of treats used. It is also important to note that the toy has a body composed of a highly durable, flexible material with high tensile strength and puncture resistance[,] (most likely an elastomer)[,] that can withstand extensive chewing before showing any signs of wear. Also, the body is shaped in a way that evokes play, such as a ball, encouraging the pet to use the toy even without the addition of edible treats or sensory attractors.

AS A RESULT OF REEXAMINATION, IT HAS BEEN DETERMINED THAT:

Claims 2 and 7 are cancelled.

Claims 1, 3, 5, 6 and 8–11 are determined to be patentable as amended.

Claim 4, dependent on an amended claim, is determined to be patentable.

New claims 12 and 13 are added and determined to be patentable.

1. A non-consumable animal toy comprising:
   a three-dimensional body formed of substantially solid resilient material;
   said body having a gripping shaft formed centrally through said body and open at each end thereof, said gripping shaft including spaced flexible splines which are substantially coextensive with said gripping shaft and which cooperatively act to resiliently receive and hold a small quantity of animal food or attractant whereby the animal food or attractant is accessible for consumption or sensory detection, respectively, by an animal from each said open end of said gripping shaft[.]; *and*
   *a circumferential bead integrally formed around said body and extending away from said gripping shaft to enhance throwability and resistance to rolling movement during play by the animal.*

3. A non-consumable animal toy as set forth in claim 1, wherein:
   said body is substantially spherical [in shape and includes a circumferential outwardly extending continuous bead integrally formed therearound].

5. A non-consumable animal toy as set forth in claim 1, wherein:
   said body is substantially ellipsoidal in shape [and includes a circumferential outwardly extending centroidal bead or rib formed therearound].

6. A throwable, non-consumable animal play toy which is enhanced for animal use by receiving and retaining food and other sensory attractors comprising:
   a three-dimensional body molded of a substantially solid, resilient elastomeric material;
   a refillable, hollow food or attractant receiving and retaining shaft formed through a central portion of said body whereby said shaft is open at each end thereof for receiving food or attractant and for providing access thereto by the animal;
   resilient splines formed integrally within said shaft for biasingly retaining the food or attractant placed into said shaft[.]; *and*
   *a circumferential bead integrally formed around said body and extending away from said shaft to enhance throwability and resistance to rolling movement during play by the animal.*

8. A non-consumable animal toy as set forth in claim [7]*6*, wherein:
   distal inner edges of said splines define a substantially cylindrical longitudinally extending inner profile of said gripping shaft which determines a minimum animal food size which is retainable within said gripping shaft.

9. A non-consumable animal toy as set forth in claim 6, wherein:

said body is substantially sperical in shape [and includes a circumferential outwardly extending continuous bead integrally formed therearound].

10. A non-consumable animal toy as set forth in claim 6, wherein:

said body is substantially ellipsoidal in shape [and includes a circumferential outwardly extending centroidal bead or rib formed therearound].

11. A throwable, non-consumable animal play toy which is enhanced for animal use by receiving and retaining food and other sensory attractors comprising:

a three-dimensional body molded of a substantially solid, resilient material;

a refillable, hollow food or attractant receiving and retaining aperture formed through a central portion of said body whereby said aperture is open at each end thereof for receiving food or attractant and for providing access thereto by the animal;

said retaining aperture having a generally star-shaped cross sectional shape wherein innermost edges of said cross sectional shape are resiliently deformable for biasingly retaining the food or attractant placed into said shaft[.]; and a circumferential bead integrally formed around said body and extending away from said shaft to enhance throwability and resistance to rolling movement during play.

12. *A non-consumable animal toy comprising:*

*a three-dimensional body formed of substantially solid resilient material;*

*said body having a plurality of gripping shafts formed through said body, each gripping shaft being open at each end thereof, each said gripping shaft including spaced flexible splines which are substantially coextensive with each said gripping shaft and which cooperatively act to resiliently receive and hold a small quantity of animal food or attractant whereby the animal food or attractant is accessible for consumption or sensory detection, respectively, by an animal from each said open end of said gripping shaft; and*

*a circumferential bead integrally formed around said body and extending away from said gripping shafts to enhance throwability and resistance to rolling movement during play.*

13. *A non-consumable animal toy comprising:*

*a three-dimensional body formed of substantially solid resilient material;*

*said body having a gripping shaft formed centrally through said body and open at each end thereof, said gripping shaft including spaced flexible splines which are substantially coextensive with said gripping shaft and which cooperatively act to resiliently receive and hold a small quantity of animal food or attractant whereby the animal food or attractant is accessible for consumption or sensory detection, respectively, by an animal from each said open end of said gripping shaft; and*

*wherein opposite pairs of said splines extend a collective distance in a substantially horizontal plane across said gripping shaft which is greater than an inner profile of said gripping shaft enabling said gripping shaft to resiliently receive and hold various sized animal foods or attractants.*

\* \* \* \* \*